(12) United States Patent
Matthewson

(10) Patent No.: US 6,817,536 B1
(45) Date of Patent: Nov. 16, 2004

(54) CODED LABEL INFORMATION EXTRACTION METHOD

(75) Inventor: Peter Matthewson, Chelmsford (GB)

(73) Assignee: Flying Null Limited, Cambridge (GB)

(*) Notice: Subject to any disclaimer, the term of this patent is extended or adjusted under 35 U.S.C. 154(b) by 250 days.

(21) Appl. No.: 10/048,077

(22) PCT Filed: Aug. 4, 2000

(86) PCT No.: PCT/GB00/03006
§ 371 (c)(1),
(2), (4) Date: May 30, 2002

(87) PCT Pub. No.: WO01/11541
PCT Pub. Date: Feb. 15, 2001

(30) Foreign Application Priority Data

Aug. 6, 1999 (GB) .............................................. 9918657

(51) Int. Cl.⁷ ................................................ G06K 7/16
(52) U.S. Cl. ...................................................... 235/493
(58) Field of Search ................................ 235/493, 494; 324/200, 207.17, 207.24, 207.25, 207.33; 341/15

(56) References Cited

U.S. PATENT DOCUMENTS

| | | | |
|---|---|---|---|
| 4,761,544 A | | 8/1988 | Poland |
| 5,001,458 A | * | 3/1991 | Tyren et al. ................. 340/551 |
| 5,029,291 A | * | 7/1991 | Zhou et al. .................. 340/551 |
| 5,369,260 A | | 11/1994 | Schuessler |
| 5,650,236 A | * | 7/1997 | Hirano et al. ................ 428/611 |
| 5,821,859 A | * | 10/1998 | Schrott et al. ............ 340/572.6 |
| 5,831,532 A | * | 11/1998 | Gambino et al. ......... 340/572.1 |
| 5,917,170 A | * | 6/1999 | Zocca ......................... 235/436 |
| 6,118,271 A | * | 9/2000 | Ely et al. ................ 324/207.17 |

FOREIGN PATENT DOCUMENTS

| | | | |
|---|---|---|---|
| EP | 790572 A2 | 8/1997 | |
| WO | WO 8906810 A1 * | 7/1989 | ............ G01V/3/08 |
| WO | WO 96/31790 A1 | 10/1996 | |

* cited by examiner

Primary Examiner—Diane I. Lee
(74) Attorney, Agent, or Firm—Welsh & Katz, Ltd.

(57) ABSTRACT

In a method of interpreting coded information carriers, a plurality of magnetic elements supported by, or incorporated in, a substrate, are interrogated. The relative positions and/or physical dimensions of the magnetic elements represent the information encoded by the information carrier. The relative positions and/or physical dimensions are determined from the relative velocity between an interrogating signal and each of the magnetic elements.

24 Claims, 5 Drawing Sheets

Element Amplitudes Categorised: H,L,H,L,H,L,H,L,L,H

+++ Data Points Used In Fit
—— Least Squares Fit
□□□ Full Data

Nearest Integers To Gap Number Is 3,2,2,1,7,0,0,2,1

CODED LABEL INFORMATION EXTRACTION METHOD

FIELD OF THE INVENTION

The present invention relates to methods of interpreting coded information carriers and to methods of processing the response of such carriers to an interrogating magnetic field.

BACKGROUND OF THE INVENTION

In certain types of human and machine-readable information-bearing label, a set of elements is used to represent the information contained in the label. This representation may be made by varying the characteristics of the elements comprising the label, and also by the position in which the label elements are placed. Reading apparatus senses the characteristics and placement of the elements in order to decode the information contained within the label. The elements in the label are sequentially scanned, to discover the presence of the constituent elements and to measure their characteristics and position and thence to decode the information contained by the label.

SUMMARY OF THE INVENTION

This application describes label coding methods by which information represented on such a label can be decoded. Typical label embodiments are where the label is manufactured from a plurality of magnetically active elements supported on a substrate. Information is coded by controlling the relative positions. Independent control of the physical properties of the elements, such as shape may also be used.

In alternative embodiments, information may be coded by controlling the relative angles of orientation of the easy axis of the magnetic elements and in some cases element shape some other physical property can be independently controlled to further encode the information carrier.

In certain types of label decoding system a label consisting of a set of elements is scanned, that is the elements are activated in turn by applying a signal to which the scanned element responds, and to which the reading apparatus is sensitive. Either or both of the means of generating the scanning signal, and the means of generating the received Signal in the reading apparatus select a single elements in turn so that the signal from a particular element may be resolved from that of the other elements.

According to one aspect of the present invention there is provided a method of decoding an information carrier comprising a plurality of magnetic elements supported by, or incorporated in, a substrate, wherein the relative positions and/or physical dimensions of said magnetic elements represents the information encoded by said information carrier, the method comprising the steps of:

i) applying an interrogation signal to each of the elements of said information carrier;

ii) detecting the response of said magnetic elements to said interrogation signal;

iii) processing the response detected in ii) so as to determine an estimate of a mathematical function which defines the relative velocity between the interrogating signal and each of the magnetic elements, from which the relative positions and/or the relative physical dimensions can be determined.

Conveniently, detection of the magnetic response of said magnetic elements may comprise observation of harmonics which are generated by the magnetic element from an applied AC field as its magnetic state is altered by the interrogating magnetic field. The presence of a magnetic element and details of the physical dimensions of the magnetic element, can advantageously be identified in a plot of the detected amplitude of the harmonic signal. The presence of a set of signals in the otherwise quiescent detected signal indicates the issuance of harmonic signal by a magnetic element as its magnetic properties are active. The means of scanning may be automatic by electronically scanning the interrogating signal and the receive sensitivity along the label or by an automatic mechanism causing the label elements to be interrogated in turn. Alternatively the scanning may be manually operated where the label is moved past the reading apparatus by hand, or alternatively the reading apparatus or part thereof may be moved past the label by hand.

Information may be advantageously encoded into the label by varying either the length of the material elements, that is the size of the element normal to the longitudinal axis of the label, or the width of the elements. By maintaining the element width constant, variations in element length predominantly cause a change in amplitude of the received signal which can be detected in order to recognise additional coded information.

DESCRIPTION OF THE DRAWINGS

For a better understanding of the present invention and to show how the same maybe carried into effect, reference will now be made by way of example to the accompanying drawings in which.

DESCRIPTION OF THE PREFERRED EMBODIMENTS

Figure 1A:
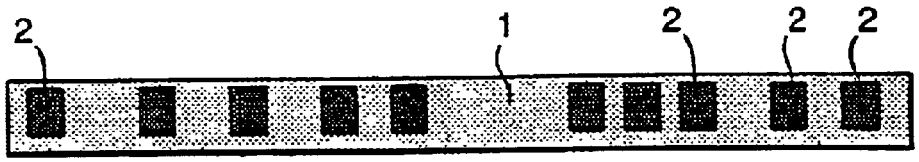
FIG. 1a shows a coded information carrier according to the present invention.

FIG. 1a shows a plan view of a label 1 comprising a plurality of magnetic elements 2. The elements are made out of high permeability, low coercivity magnetic thin film material such as Atalante manufactured by IST(Belgium). In this particular example the elements are substantially equal in size and have dimensions of 1 mm×1.5 mm. The easy axis of the material is arranged so as to be parallel with the longitudinal axis of the label.

In order to interrogate the label 1, a reading antenna is passed by the label subjecting each element 30 in turn to a region of null magnetic field formed by a permanent magnet arrangement. That is a magnetic field comprising regions of high saturating magnetic field contiguous with regions of zero magnetic field. A superimposed high frequency field, in this case 6.348 kHz, causes the material element to switch when it is present in the magnetic null. In other words the element is driven over its B-H loop as it passes through the zero magnetic field region. A receive coil is used to detect the harmonic signals resulting from the element switching, and the received harmonic signal is mixed to baseband and filtered prior to digitisation.

Figure 1B:
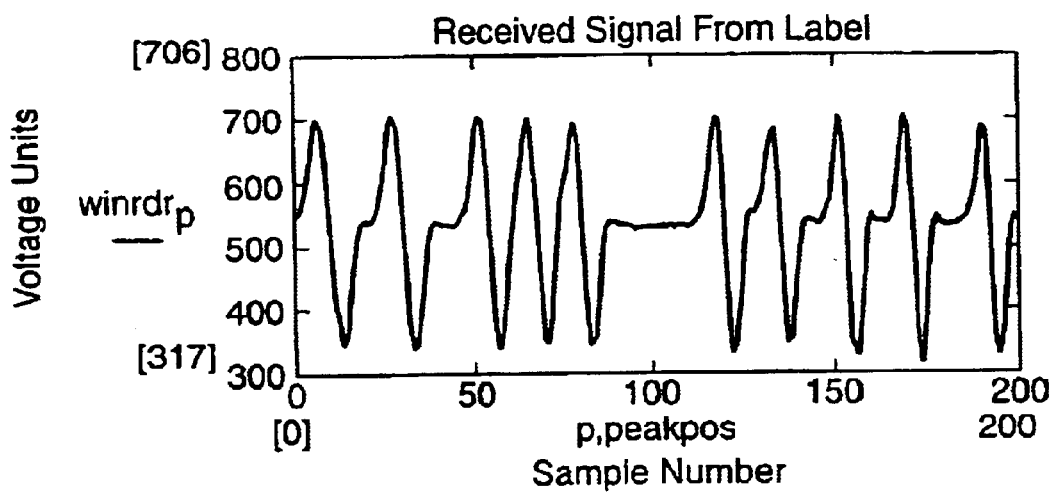
FIG. 1b shows the variation in amplitude of the second harmonic frequency as the information carrier is subjected to an interrogating magnetic field.
Figure 1C:
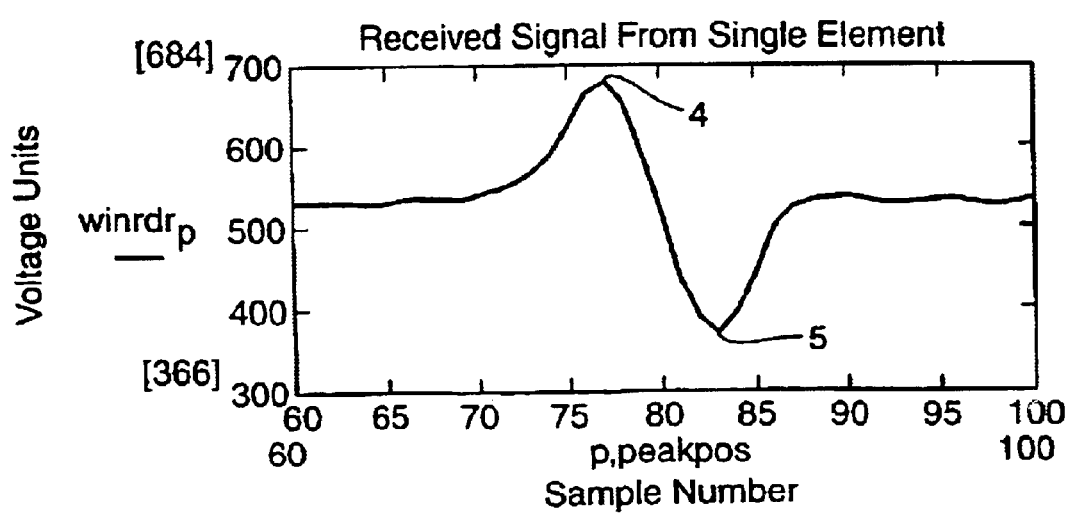
FIG. 1c shows the receive signal from a single magnetic element.

FIG. 1b shows a typical signal received from such a label, wherein the read head is passed in proximity with the information carrier and is arranged to detect the second harmonic of the element switching signals. The signal from a single element is shown in FIG. 1c which shows two half peaks 4 and 5 of opposite sign with a zero crossing. It can be seen that the label signal approximates a superposition of single element responses at each position in which there is an element.

The signal is sampled with a fixed sample rate, and converted to a digital representation in an analogue to digital converter. The sample rate must be fast enough to capture the signal information in accordance with the Nyquist criterion, preferably with anti-aliasing filtering prior to the sampling operation.

The sample number of the center of each element response depends upon the time at which the element passed the read head.

In addition, the width of the element response depends upon the speed at which the element passed the read head. Information about the dynamics of the relative motion of the tag and the read head can therefore be inferred from measuring the width of the signal. This can be achieved by measuring the width of the positive going and negative going peak associated with the element. It can also be achieved by measuring the separation between the positive and negative going peaks. This speed estimate is fundamental to estimates of the dynamics of motion and allows the information in the label to be decoded reliably without compromising the available code space by adding regular features in the label.

In alternative implementations of the reading apparatus, the scanning motion of the magnetic null relative to the label may be achieved by electronically scanning using a set of excitation coils that are driven in a phased manner so as to cause the magnetic null to propagate in space. The null may be scanned at a speed which allows the switching of the label elements to be detected directly from the receive coils without needing to superimpose a separate high frequency excitation field. In this case the material element response coupled into the receiver is a single peak.

Figure 1D:
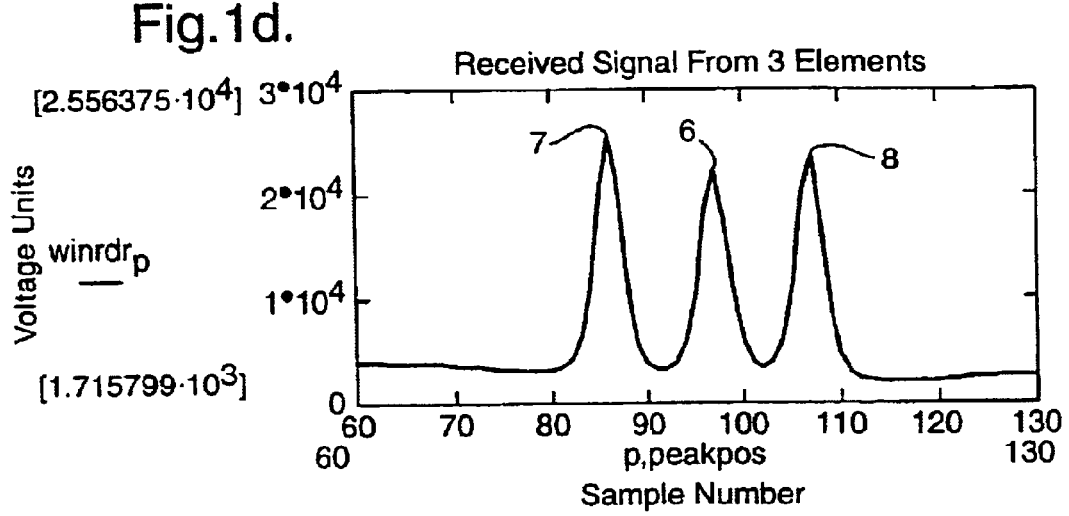
FIG. 1d shows the received fundamental signal from three magnetic elements.

FIG. 1d shows 3 adjacent peaks 6, 7 and 8 of the fundamental signal from 3 magnetic elements recorded from a reading system employing electronic scanning in this case the width of the response from each magnetic element can be used to provide an estimate of the velocity of the scanning null as it passed over the element being scanned. This information can be used to estimate the detailed dynamics of motion and the errors arising from the system and also from misalignment of the label with respect to the nominal read axis of the read head.

Information can be encoded into the label by varying the length of the material elements, that is the size of the element normal to the longitudinal axis of the label, or the width, that is the size of the element along the longitudinal axis.

Figure 2A:
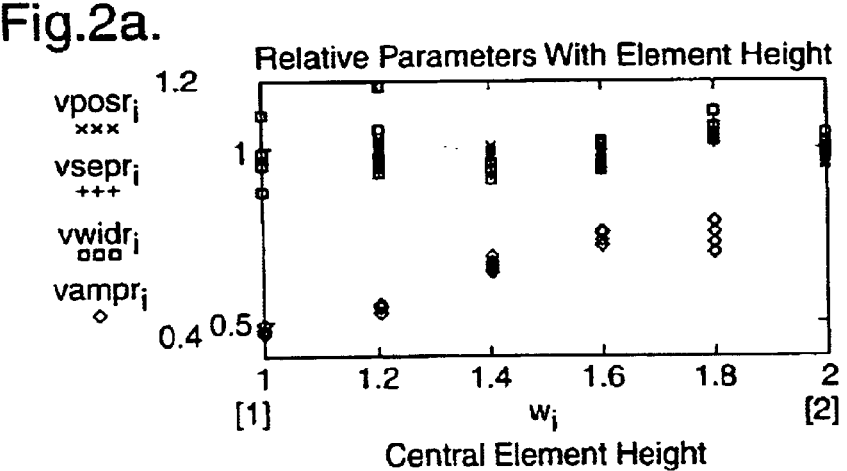
FIG. 2a shows the relative variation of the received second harmonic signal with element length.
Figure 2B:
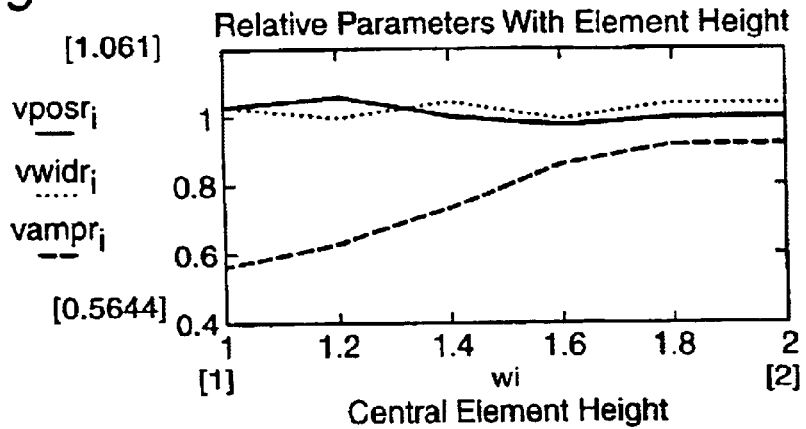
FIG. 2b shows the relative variation of received fundamental signal with element length.

By maintaining the element width constant, variations in element length predominantly cause a change in amplitude of the received signal as illustrated in FIG. 2a for the mechanically scanned second harmonic system, and in FIG. 2b for an electronically scanned system detecting the fundamental signal received from the label.

A set of linear test labels with 3 elements was manufactured with the element positions at 0 mm, 1.5 mm, 3 mm along the longitudinal axis of the label. The element widths were 1 mm and the length of the center element varied between l am and 2 mm. For each label, in FIG. 2a, the peak position, the half peak width, the half peak separation and the amplitude difference between the half peaks is advantageously measured. The relative variation of these parameters of the central test element compared with the outer elements, which were maintained at constant length, may be plotted as shown in FIG. 2b. The measured central element amplitude (vampr), relative to the outer elements, shows a clear, near linear relationship to central element length. The measured central element relative position (vposr), width (vwidr) and separation (vsepr) parameters do not vary significantly with central element length, over and above the effects of experimental errors and imperfections in the manufacture of the test labels.

Similarly FIG. 2b shows the relative variation of measured central element amplitude, position and width with element length when the test labels were measured in an electronically scanning reading system and shows a similar near linear relationship to the mechanically scanned reading method receiving second harmonic signals.

Figure 3A:
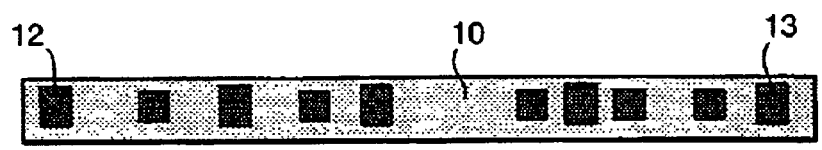
FIG. 3a show a coded information carrier according to the present invention, wherein the magnetic element are length coded.
Figure 3B:
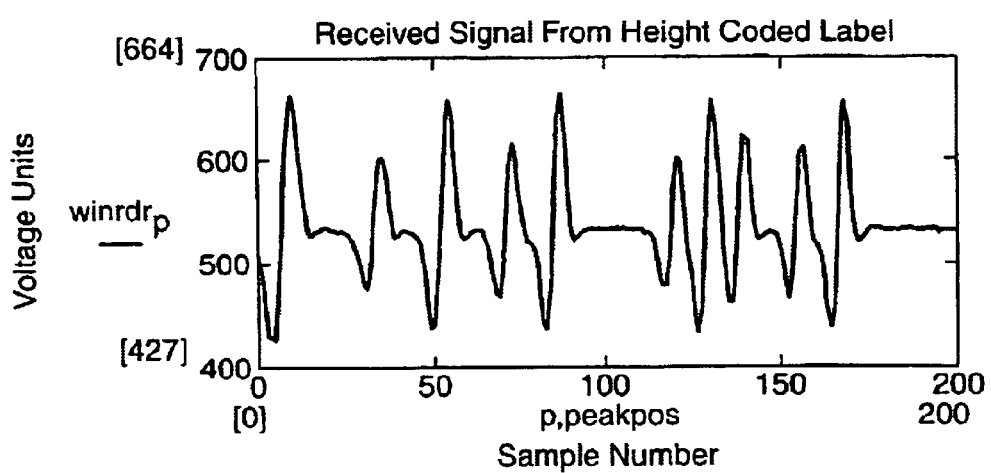
FIG. 3b shows the receive signal from an information carrier having length coding.

A label in which element length has been used to encode additional information is shown in FIG. 3a, which shows a label 10 in which two element [with elements of one of two] lengths are used to modulate the elements in the code. The corresponding received signal is shown in FIG. 3b in which a difference in received amplitude from elements of different lengths can be observed. A typical design goal is to maximise the range at which a label may be read. A compromise is needed to maximise reading range for a 2-length label, at the same time as maximising the ability to discriminate the lengths of individual elements. In order to discriminate the length of label elements reliably, certain of these elements may be constrained to be at a known length to act as a reference. In the example illustrated in 3a, the 2 end elements, 12 and 13, of the label are maintained at maximum length to act as a reference. A design rule may also constrain a certain number of the inner elements to also be at maximum length. The reference elements may be at any a priori fixed position, or at a position determined by an a priori rule.

The half peak width, or half peak separation can be measured and, in the case of a reader detecting the second harmonic of the label signal, can be used to form an estimate of the velocity of the interrogation field, at the time when a particular element was scanned, Alternatively, in the case of a reader detecting the fundamental of the label signal, an estimate of the peak width can be used to form an estimate of the velocity of the scanning, at the time when the element was scanned. These estimates are typically $K/w\_est$ where K is some constant, and $w\_est$ is the estimate of width or half peak separation, as appropriate. The value of K typically depends on parameters of the reader, the element shape and the position of the element relative to the read antenna. Since K varies with element properties and to facilitate the estimation of the scanning dynamics, K may only be estimated to for elements of the same type based on the amplitude of the element signals.

The first step in processing a received signal such as shown in FIG. 1b or FIG. 3b is to estimate the parameters of the peaks contained within the signal. This is achieved with the following steps:

The signal is delimited, that is the continuous received signal is broken up into a contiguous set of samples containing the received signal from one label, or a set of peaks that is likely to contain enough information to decode the label, in the case of non-registered repeating codes.

The signals from this delimited period are sorted into order of ascending magnitude. An indexed sort function, for example using the Quicksort method, such as index( ) (Numerical Recipes in C, second edition, ISBN 0 521 43108 5) is appropriate so that the original location of the point of any rank can be quickly found. The median value is found from the sorted data and provides a good estimate of the quiescent signal level. The median is subtracted from all signal points so that the quiescent level is close to zero.

The positive half peaks are found by working down from the largest signal in magnitude in the sorted data, testing the signal points as follows. If the test signal point is a peak, that is its adjacent signals are lower in magnitude it is estimated as a positive half peak, and its amplitude is interpolated by interpolation of the peak and its neighbouring points.

From each positive half peak found, the signal is scanned forward and backwards to find the points at which it falls below a defined magnitude relative to the peak, this is interpolated to a fraction of a sample period A typical magnitude value is 0.8 of the peak value found. The half peak width is estimated as the difference in position between these points. The half peak position is estimated as the average of these two points. The half peak is rejected if it overlaps with any other pre-existing peak in the list that is its width about its position interferes the width about any other peak position in the list. If it is not rejected, the half peak is appended to a list of half peaks.

The peak finding process stops when the magnitude of the next highest point falls below an absolute threshold, or when it falls below a defined fraction of the largest magnitude signal, for example 0.3 of the largest magnitude signal, or if a limit for the number of peaks is reached.

The negative half peaks are found by working up in magnitude from the lowest signal in magnitude in the sorted data, testing signal points of increasing magnitude. If the test signal point is a negative peak, that is its adjacent signals are higher in magnitude it is estimated as a negative half peak, and its amplitude is interpolated by interpolation of the peak and its neighbouring points.

For each negative half peak, the signal is scanned forward and backwards to find the points at which it increases above a defined magnitude relative to the negative peak, this is interpolated to a fraction of a sample period. The half peak width is estimated as the difference in position between these points. The half peak position is estimated as the average of these two points. The half peak is rejected if it overlaps with any other pre-existing peak in the list, that is its width about its position interferes the width about any other peak position in the list. If it is not rejected by this test it is then appended to a list of half peaks.

The negative peak finding process stops when the magnitude of the next highest point falls above an absolute threshold, or when it falls above a defined fraction of the largest magnitude signal, or if a limit for the number of peaks is reached.

The resultant list of positive and negative half peaks is then sorted into range order. This process will interleave the consecutive half peaks.

Merging range consecutive pairs of half peaks in the range sorted half peak list forms a list of double peaks. The amplitude of the merged double peak is the difference in amplitude of two half peaks being merged. The position of the merged double peak is the average of the two half peak positions. The width of the merged double peak is the average of two half-peak widths. The separation of the merged double peak is the difference between the two half peak positions.

Figure 4A:
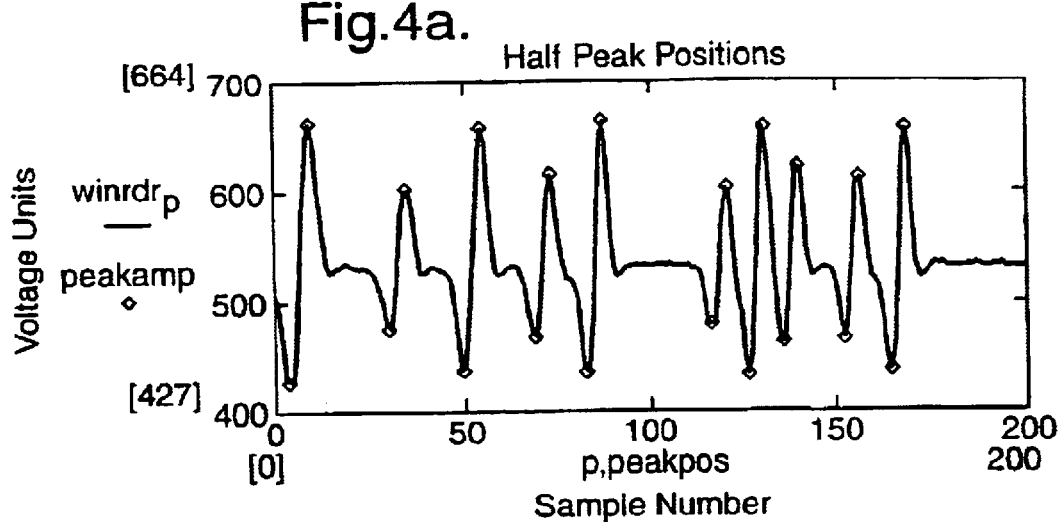
FIG. 4a shows the positions of the half peaks of the detected signal shown in FIG. 3b.
Figure 4B:
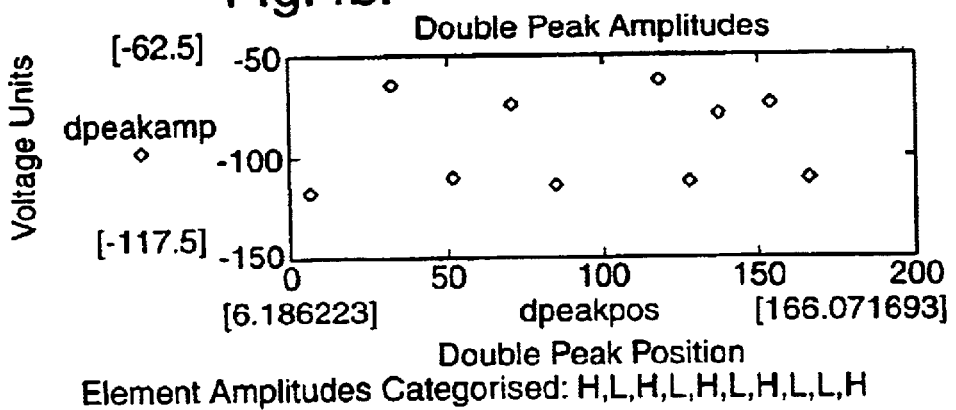
FIG. 4b shows the magnitude of the double peaks in amplitude units.
Figure 4C:
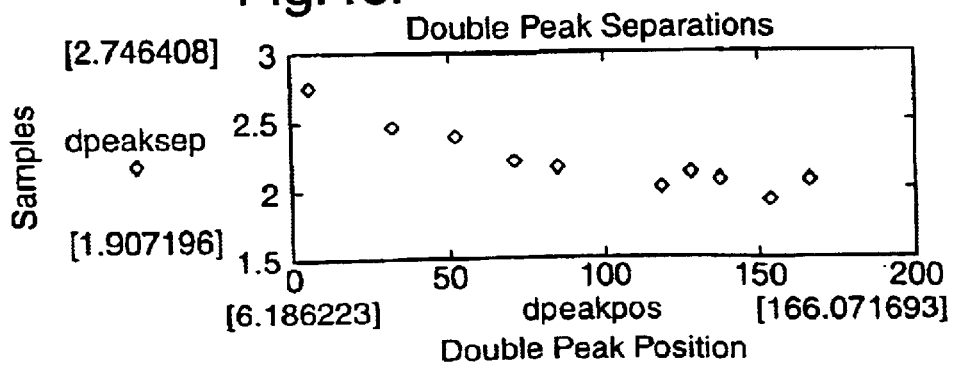
FIG. 4c shows a plot of the double peak separations versus double peak position.

The results of this half peak finding process are illustrated in FIG. 4a which shows the half peaks found when the signal shown in FIG. 3b is processed, and shows the output of step 9 above. These peaks are shown with a cross at the located position and estimated amplitude. FIG. 4b shows the magnitude of the double peaks in amplitude units. In this case the amplitudes are negative since the first half peak is a negative going peak. The difference in peak amplitude between the full length and reduced length elements in the label can be clearly seen. FIG. 4c shows the double peak separations versus double peak position showing the variation across the scanning of the label.

In the case of a fundamental signal where there is just one peak per element, such as that shown in FIG. 1d, a simpler process is may be used, missing steps 6 to 10 above since there is no need to find and merge double peaks.

There are N label elements positions whose centers are located at $X_1 \ldots X_N$ along the longitudinal axis of the label, and whose position we wish to estimate. It is assumed that $X_1$ is at position 0.0 and that the final element, $X_N$ is at the known position of corresponding to the length of the label L.

The peak list as described above contains estimates of the sample number, and hence times $T_i$ at which the reader detected a double peak. For each element i, the time $T_i$, is simply the position in samples where the peak was measured multiplied by the sample period, which is the reciprocal of the sampling rate.

By using the estimated double peak width or double peak separation for each of the N peaks denoted $W_i$ a velocity estimate for the $i^{th}$ peak is $VE_i=1/W_i$ at time $T_1$.

The order M velocity function of time is modelled by a polynomial function. M is chosen to allow sufficient degrees of freedom to model the dynamics of label motion sufficiently accurately. It can range from 1 (constant acceleration model) upwards.

$$VF(t,M)=a_0+a_1t+a_2t^2+a_3t^3+ \ldots a_Mt^M$$

where {a} are a set of polynomial coefficients to be determined.

The squared error for velocity estimate $VE_i$ at time $T_i$ is $E_i^2=(VE_i-VF(T_i,M))^2$ The total sum of the squared errors is $ES(M)=E_1^2+E_2^2+ \ldots +E_N^2$ which is minimised by varying the M+1 parameters $a_0, a_1 \ldots a_M$ This is achieved by the method of least squares to find the optimum parameters in the least squares sense.

Define the matrix X to contain the $T_i$ values raised to a given power. For example column 0 row i of X contains $T_i^0$ and column M row 4 of X contains $T_4^M$. Define the vector V to contain the velocity estimates $VE_i$. For example the element in row 4 of V contains $VE_4$ Some linear combination of the columns in X will be closest to the vector V in the least-squares sense. The coefficients of this linear combination will be the coefficients of the best-fitting polynomial. If A is the vector of length M+1 that holds the coefficients, the problem is to find the value for A that gives the best "near-solution" to the system of equations XA=V. If the columns of X are independent, the best choice for A is given by:

$$A=(X^T X)^{-1}(X^T V)$$

Where "$T$" represents matrix transpose and "$-1$" represents matrix inversion. The coefficient $a_i$ is then the element from row i of A. This may be efficiently calculated by using methods such as LU decomposition, for examples the functions ludcmp( ) and lubksb( ) (Numerical Recipes in C, second edition, ISBN 0 521 43108 5)

Figure 4D:
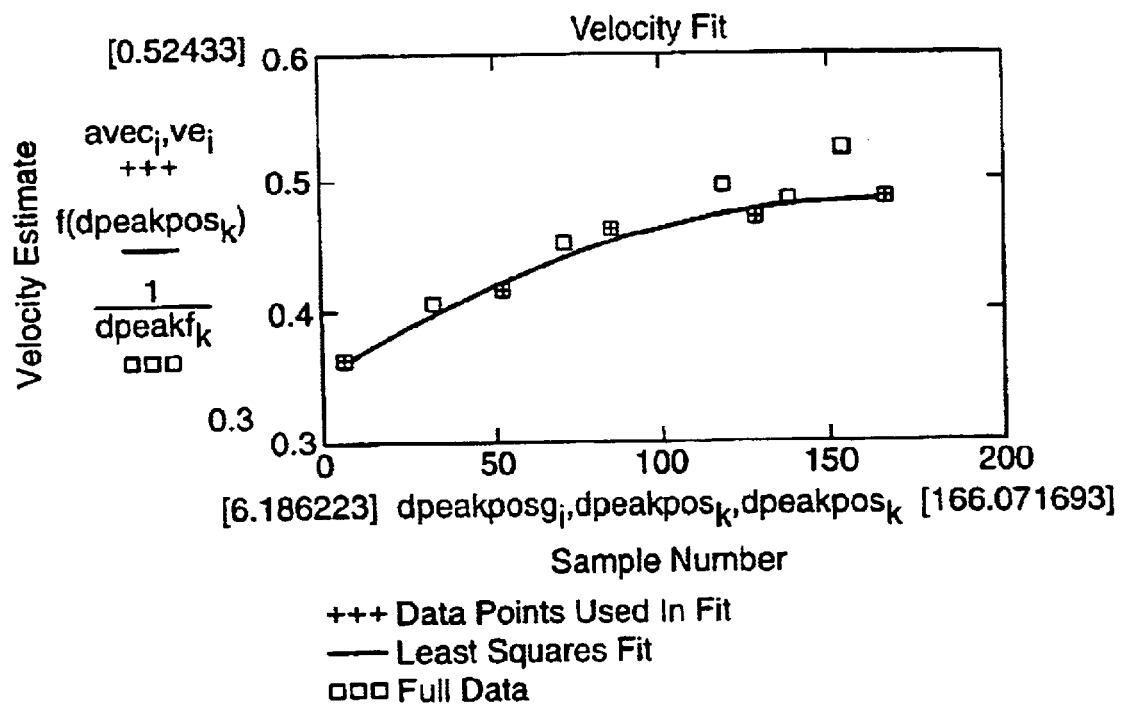
FIG. 4d shows a plot of the velocity estimates of selected points versus time.

This process is illustrated in FIG. 4d where the velocity estimates W that were computed from the double peak separation data of FIG. 4c are shown, those points marked "full data" contain the velocity estimates from all the peaks. In this example case, only the estimates from peaks with high amplitude, see FIG. 4b, are selected for velocity fitting. These selected points are marked "Data points used in fit". If the label known a priori to have elements of the same size then all elements would have been used. A least squares fit of order 2 was used and the continuous line shows the estimated velocity function as a function of sample number. A least squares fit of order 1, 2 or 3 is typically sufficient to model the velocity function with sufficient accuracy.

Error metrics are computed to allow the decoding algorithms to assess the quality of the read. A useful normalised velocity error metric, denoted evel, to quantify how well the velocity function fitted the data observed is defined. It is the sum of squares of the normalised error defined as $$evel=sum(EL_i^2/VE_i^2) \text{ for } i=1 \ldots N$$

The vector A could also be estimated by an iterative minimisation procedure such as Powell's method.

The above procedure can be repeated for varying model order M on the same data in order to find the best approximation. Preferably this is the solution with the smallest number of degrees of freedom, that fits the data read by the reader with the lowest error metrics.

Analytical interrogation and normalisation of tag length

The velocity fit function is $VF(t,M)=a_0+a_1 t+a_2 t^2+a_3 t^3+ \ldots +a_M t^M$ This may be analytically integrated to find the positional fit function $$P(t,M)=Q+a_0 t+(\frac{1}{2})a_1 t^2 (\frac{1}{3}) a_2 t^3+ \ldots +(1/(M+1))a_M t^{M+1}$$

where Q is an arbitrary constant of integration, set to zero.

We know that the position of label element 1 is at 0.0.

We also know that the position of element N, the last element scanned is L, the length of the label. The final estimates of element position are:

$$XE_i.L.(P(X_i,M)-P(X_1,M))/(P(XN,M)-P(X_1,M))$$

Binning of Data

There are N positional estimates $XE_1$ to $XE_N$ from which N−1 gaps may be estimated.

Typically the gaps have the minimum gap subtracted, and are divided by the minimum gap, to give a real number representing the number of gap increments. The nearest integer is then taken to represent the gap for subsequent decoding. This can be expressed as:

The N−1 normalised gaps $R_j$ are calculated by $R_j=(XE_{j+1}-XE_j-\text{Minimum\_Gap})/\text{Gap\_Increment}$ for j=1 ... N−1

The normalised gaps are then converted to their nearest integer representation $G_j$ int($R_j$+0.5) for j=1 ... N−1, where int(x) means the truncated integer portion of x.

In this way, the gaps between each adjacent pair of magnetic elements can be defined by A+mG, wherein A is a first fixed value; m is an integer (which may be zero); and G is a second fixed value One useful error metric, denoted emax, is defined as the maximum magnitude of the difference between $G_j$ and $R_j$. Another useful error metric, denoted eav, is the average magnitude of the difference between $G_j$ and $R_j$.

Figure 4E:
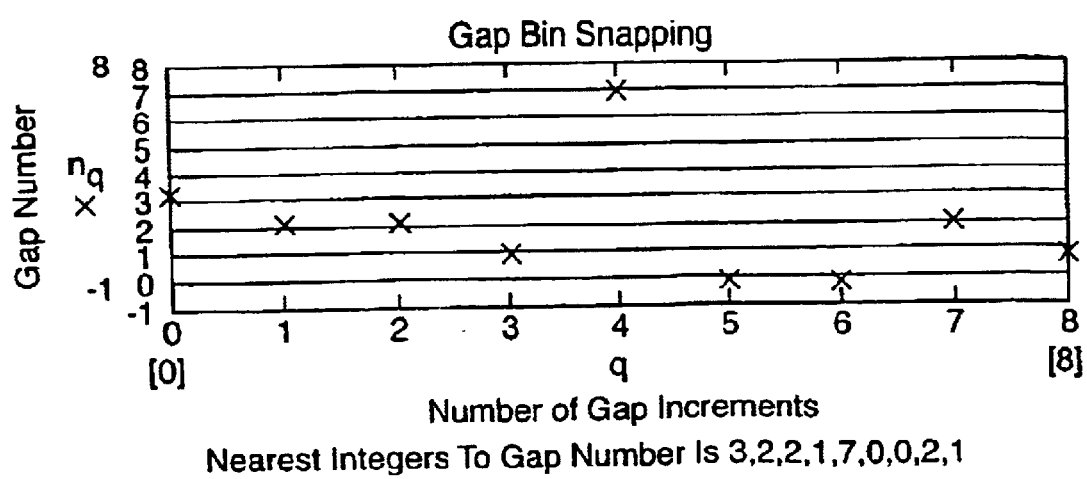
FIG. 4e shows the resultant fit of gap number to integer grid.

FIG. 4e shows the gap sequence data $R_i$ computed from the data in FIGS. 4a–d, and shows the close correspondence or "snapping" to an integer grid, giving a high confidence that the gaps have been correctly measured. The gap sequence in this case is 3,2,2,1,7,0,0,2,1.

Enumeration Algorithms

Depending on the coding scheme used, the gap sequence is enumerated to a unique decoded value. Various codes exist that have different properties for example those codes allowing read direction to be determined, or those that allow non-registered operation, that is allowing the gap sequence to start at any position, for example a portion of a repeating gap sequence. The code may be determined a priori, or diagnosed by examining the read signals for the number of material elements present, or by estimating the sum of the gap numbers. It is preferable to determine this beforehand in order to minimise the chance of misinterpreting a given set of read data.

For certain codes, the number of elements in the label may be one of a range of possible values, with fixed label length in order to increase the number of possible codes.

The direction finding codes are preferably used where amplitude coding is used to allow the amplitude information to be associated with the correct element.

Amplitude threshold estimation of elements

Where it is desired to detect the size of the received element signal, for example when the elements may be of two or more sizes, reference elements may be placed in the set of elements used to make the label. In one embodiment, the end elements are constrained to be the largest element size to act as a reference. Other embodiments may place reference elements that have some unique characteristic, or may be identified by an a priori rule.

The amplitudes are measured and used to compute normalised amplitudes. This is because the reference elements may be significantly different in magnitude. This may be due to the scanning process varying the distance or angle of the read head from the label during the read, or other factors.

The estimates of element position $XE_i$ may be used for linear interpolation of the reference amplitude along the label. The reference amplitude predicted at the estimated position of the element divides the measured element amplitudes to normalise the amplitudes. The normalised amplitudes should be nominally 1.0 for an element the same size as the reference element.

Threshold levels are set to provide discrimination between the possible element amplitudes and to classify the amplitude of the element into one of an alphabet of values. For example if there are two values then the amplitude is either high or low. For example a half length element may have an amplitude, on average, half the reference amplitude ie 0.5. In this case, the threshold level should be set to approximately 0.75 in order to determine if the element was full length or half length.

Preferably a code is used which enables the direction of reading of the label to be determined by the sequence of gaps that resulted. In this case the elements can be uniquely identified and it is known which element of the label to associate with the decoded amplitude information.

In the case of the label data shown in FIG. 4b, denoting the amplitudes of the signals from the elements as "H" for high amplitude and "L" for low amplitude, the elements are categorised as H,L,H,L,H,L,H,L,L,H. A larger alphabet of elements could be used by using a label with more possible shapes, for example. The categorisations are then converted to decoded data.

A typical scheme allows the inner elements only to contain data, ignoring the end elements, which are references, and maps H to a logical 0 and L to a logical 1 so that the binary data word from the example data would be 10101011. In this scheme up to 256 amplitude codes can be represented from a inner elements. Preferably the codes used are constrained to ensure that a certain number of elements in the label, for example 4 are at full length to facilitate velocity estimation. If this constraint is used, the number of amplitude codes is reduced by 37 to 219 in this case.

An amplitude error metric eamp is defined which is the normalised amplitude difference between the largest half length element diagnosed to the smallest full length element diagnosed. If there is no half-length element diagnosed, eamp is defined as the smallest full length element amplitude. In a label containing different sized elements, a large value for this metric suggests a clear discrimination in amplitude between elements of different types. Smaller values indicate increasing risk that an element may be categorised as the wrong amplitude Error Metrics The error metrics defined: evel, emax, eav and eamp can be used to determine the read quality evel, emax and eav are preferably small and eamp high. Independent thresholds for these quantities are independently established. These thresholds are based on measured values for many labels in many read operations over the range of reading ranges and scanning dynamics expected in an application. This is done to minimise the probability of a wrong code at the same time as maintaining a high probability of a correct read.

During the read decoding process, if the computed error metrics are higher than the threshold value in the case of evel, emax and eav then the read is rejected. If the error metric is lower than the threshold in the case of eamp then the read is rejected.

What is claimed is:

1. A method of decoding an information carrier comprising a plurality of magnetic elements supported by, or incorporated in, a substrate, wherein the elements are of substantially the same width and wherein the relative positions of said magnetic elements represents the information encoded by the information carrier, the method comprising the steps of:
   i) applying an interrogation signal to the information carrier so that each of the magnetic elements are subjected, in turn, to the interrogation signal;
   ii) detecting the response signal of each of the magnetic elements to said interrogation signal;
   iii) processing each response signal detected in ii) so as to determine an estimate of the relative velocity between the interrogation signal and each of the magnetic elements; and
   iv) estimating the dynamics of motion between the interrogation signal and the information carrier, by consideration of the processed signals obtained in iii), so as to determine the relative positions of the magnetic elements.

2. A method according to claim 1, wherein said magnetic elements comprise high permeability, low coercivity material having an easy axis of magnetisation.

3. A method according to claim 1, wherein said interrogation signal comprises regions of high saturating magnetic field contiguous with regions of zero magnetic field.

4. A method according to claim 1, wherein the frequency of the detected response generated by said magnetic elements is a harmonic of the interrogation signal.

5. A method according to any claim 4, wherein a graphical representation of the response signal is obtained by plotting the amplitude of the detected signal against time, wherein the presence of a magnetic element is indicated by two half peaks of opposite polarity in the detected response signal.

6. A method according to claim 5, wherein the half peaks in the detected response signal are identified by the following steps:
   i) obtaining a contiguous set of sample points from the detected response signal;
   ii) sorting the samples points into an order of ascending magnitude;
   iii) finding the median value from the sorted samples and subtracting this value from each of the sample points;
   iv) testing the sample points in order to identify the peaks, wherein a positive polarity half peak is identified by the presence of lower magnitude signals either side of the signal point being tested, and a negative polarity half peak is identified by the presence of higher magnitude signal either side of the signal point being tested.

7. A method according to claim 6, wherein the relative velocity between the interrogation signal and each of the magnetic elements is determined by:
   i) determining the two positions either side of the peak at which the amplitude of the detected response signal is a predetermined fraction of the peak amplitude value; and
   vi) determining the distance between these two positions to give the half peak width.

8. A method according to claim 7, wherein the velocity of the interrogation signal, with respect to each magnetic element, is determined from the values of each of the half peak widths.

9. A method according to claim 7, wherein the velocity function of the interrogation signal is modelled by a polynomial function, the coefficients of which are determined by the estimates of the velocity of the interrogation signal at each magnetic element.

10. A method according to claim 9, wherein said mathematical function is integrated with respect to time so as to determine the size of the gaps between each of the magnetic elements.

11. A method according to claim 10, wherein the size of the measured gaps between each adjacent pair of magnetic elements are modelled by A+mG, wherein A is a first fixed value; m is an integer (which may be zero); and G is a second fixed value.

12. A method according to claim 9, further comprising the step of determining an error metric of the velocity function.

13. A method according to claim 9, further comprising the step of determining an error metric of the measured gaps between the magnetic elements compared with the gap widths as modelled by A+mG where m is a decoded integer from each measured gap.

14. A method according to claim 9, further comprising the step of determining an error metric of the amplitude of the magnetic response.

15. A method according to any one of claim 12, 13 or 14, wherein the decoded information is rejection if the error metric is found to be higher than a threshold level.

16. A method according to claim 6, wherein an estimate of the relative velocity between the interrogation signal and the information carrier during its interaction with each of the magnetic elements is determined by measuring the separation between the two half peaks of opposite polarity.

17. A method according to claim 1, wherein the frequency of the detected response generated by said magnetic elements is the second harmonic of the interrogation signal.

18. A method according to claim 1, wherein the frequency of the detected response generated by said magnetic elements is the fundamental frequency of the interrogation signal.

19. A method according to claim 18, wherein a graphical representation of the response signal is obtained by plotting the amplitude of the detected signal against time, wherein the presence of a magnetic element is indicated by a peak in the detected response signal.

20. A method according to claim 19, wherein the peaks in the detected response signal are identified by the following steps:

i) obtaining a contiguous set of sample points from the detected response signal;

ii) sorting the samples points into an order of ascending magnitude, iii) finding the median value from the sorted samples and subtracting this value from each of the sample points;

iv) testing the sample points in order to identify the peaks, wherein a peak is identified by the presence of lower magnitude signals either side of the signal point being tested.

21. A method according to claim 20, wherein an estimate of the relative velocity between the interrogation signal and each of the magnetic elements is determined by:

i) determining the two positions either side of the peak at which the amplitude of the detected response signal is a predetermined fraction of the peak amplitude value; and ii) determining the distance between these two positions to give the peak width.

22. A method according to claim 21, wherein the interrogation signal, with respect to each magnetic element, is determined from the values of each of the peak widths.

23. A method according to claim 1, further comprising the step of decoding a variation in length of the magnetic elements, wherein the amplitude of the detected signal response is directly related to the length of the element.

24. A method according to claim 23, wherein the length of at least one of the magnetic elements is or are known, thereby acting as a reference elements, with respect to which the lengths of the other magnetic elements can be determined.

* * * * *